(12) United States Patent
Kowalski

(10) Patent No.: US 9,278,486 B2
(45) Date of Patent: Mar. 8, 2016

(54) INFLATABLE ARTICLE REPAIR AND INFLATION KIT WITH A PRESSURE REDUCING DEVICE

(75) Inventor: Douglas Kowalski, Shanghai (CN)

(73) Assignee: TEK Automotive (Shanghai) Co., Ltd, Shanghai (CN)

( * ) Notice: Subject to any disclaimer, the term of this patent is extended or adjusted under 35 U.S.C. 154(b) by 52 days.

(21) Appl. No.: 14/234,530

(22) PCT Filed: Jul. 26, 2012

(86) PCT No.: PCT/CN2012/079171
§ 371 (c)(1),
(2), (4) Date: Mar. 20, 2014

(87) PCT Pub. No.: WO2013/013621
PCT Pub. Date: Jan. 31, 2013

(65) Prior Publication Data
US 2014/0190589 A1     Jul. 10, 2014

(30) Foreign Application Priority Data
Jul. 26, 2011   (CN) .......................... 2011 1 0210395

(51) Int. Cl.
| | | |
|---|---|---|
| *B65B 31/00* | (2006.01) | |
| *B29C 73/02* | (2006.01) | |
| *B29C 73/16* | (2006.01) | |
| *B60C 29/06* | (2006.01) | |
| *B29L 30/00* | (2006.01) | |

(52) U.S. Cl.
CPC ............. *B29C 73/025* (2013.01); *B29C 73/166* (2013.01); *B29L 2030/00* (2013.01); *B60C 29/062* (2013.04)

(58) Field of Classification Search
CPC .... B29C 73/025; B29C 73/166; B60C 29/062
USPC ..................... 141/38, 313, 104, 105; 137/223
See application file for complete search history.

(56) References Cited

U.S. PATENT DOCUMENTS

| | | | |
|---|---|---|---|
| 2002/0124926 A1 | 9/2002 | Colussi et al. | |
| 2010/0206426 A1* | 8/2010 | Lolli | ................................ 141/38 |
| 2012/0017727 A1* | 1/2012 | Lolli | .............................. 81/15.5 |

FOREIGN PATENT DOCUMENTS

| | | |
|---|---|---|
| CN | 2129232 Y | 4/1993 |
| CN | 2395912 | 9/2000 |
| CN | 2411917 Y | 12/2000 |
| CN | 101848803 A | 9/2010 |

* cited by examiner

*Primary Examiner* — Jason K Niesz
(74) *Attorney, Agent, or Firm* — Ladas & Patty LLP

(57) ABSTRACT

An inflatable article repair and inflation kit comprises a canister of sealing fluid; an inlet connectable to a pressure source and connected to the canister; a selector valve interposed fluidically between the inlet and the canister; a conduit connected to the selector valve, in parallel with the canister; and a flow resistance of the selector valve and the canister to reduce the pressure in the canister with respect to the pressure in the conduit. The inflatable article repair and inflation kit ensures the best pressure into the sealing fluid canister.

11 Claims, 4 Drawing Sheets

INFLATABLE ARTICLE REPAIR AND INFLATION KIT WITH A PRESSURE REDUCING DEVICE

RELATED APPLICATION INFORMATION

This application is a 371 of International Application PCT/CN2012/079171 filed 26 Jul. 2012 entitled "Inflatable Article Repair And Inflation Kit With A Pressure Reducing Device", which was published in the English Language on 31 Jan. 2013, with International Publication Number WO 2013/013621 A1, and which claims priority from CN 201110210395.4 filed 26 Jul. 2011, the content of which is incorporated herein by reference.

BACKGROUND

The present invention relates to an inflatable article repair and inflation kit with an improved pressure reducing device, and which is connected to a high-pressure source, such as a heavy-duty, wheeled vehicle brake system.

A canister of sealing fluid for repairing inflatable articles, such as tyres, is known to be connected to a pressure reducing device.

SUMMARY

It is an object of the present invention to provide an inflatable article repair and inflation kit featuring an improved pressure reducing device.

According to the present invention, there is provided a kit as claimed in Claim 1.

BRIEF DESCRIPTION OF THE DRAWINGS

A preferred, non-limiting embodiment of the present invention will be described by way of example with reference to the attached drawings, in which.

DETAILED DESCRIPTION

Figure 1:
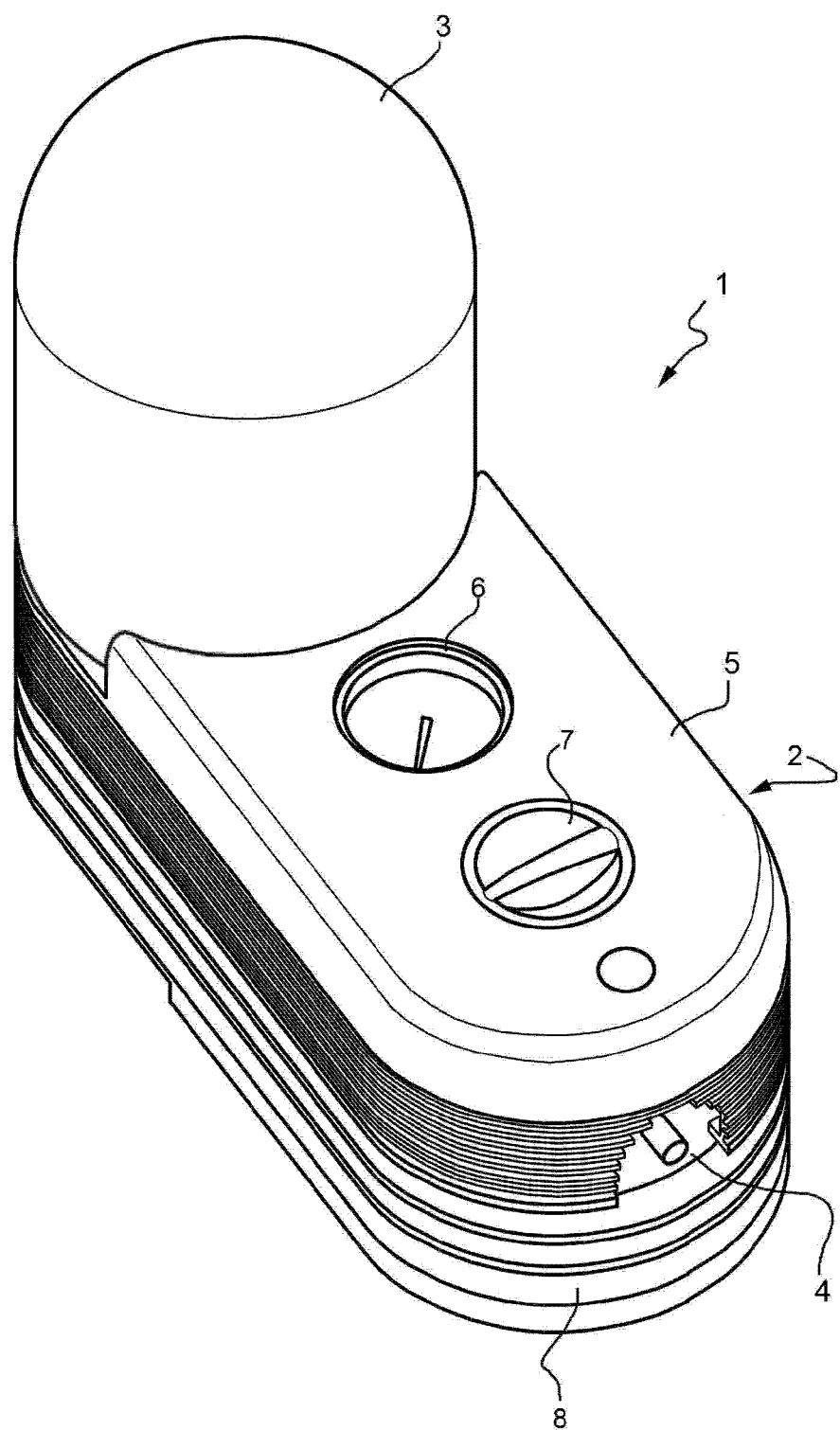
FIG. 1 shows a view in perspective of a kit in accordance with the present invention.

Number 1 in FIG. 1 indicates as a whole a tyre repair and inflation kit comprising a casing 2; a canister 3 of sealing fluid; and a compressed-air inlet 4 defined by casing 2.

Casing 2 comprises a top wall 5 fitted with a gauge 6 and a knob 7.

The lateral wall of casing 2 defines a peripheral groove that coils more than once about casing 2 and houses a hose 8 connected fluidically to canister 3, which is housed at least partly inside a seat in casing 2, on the opposite side of gauge 6 and knob 7 to inlet 4.

Figure 2:
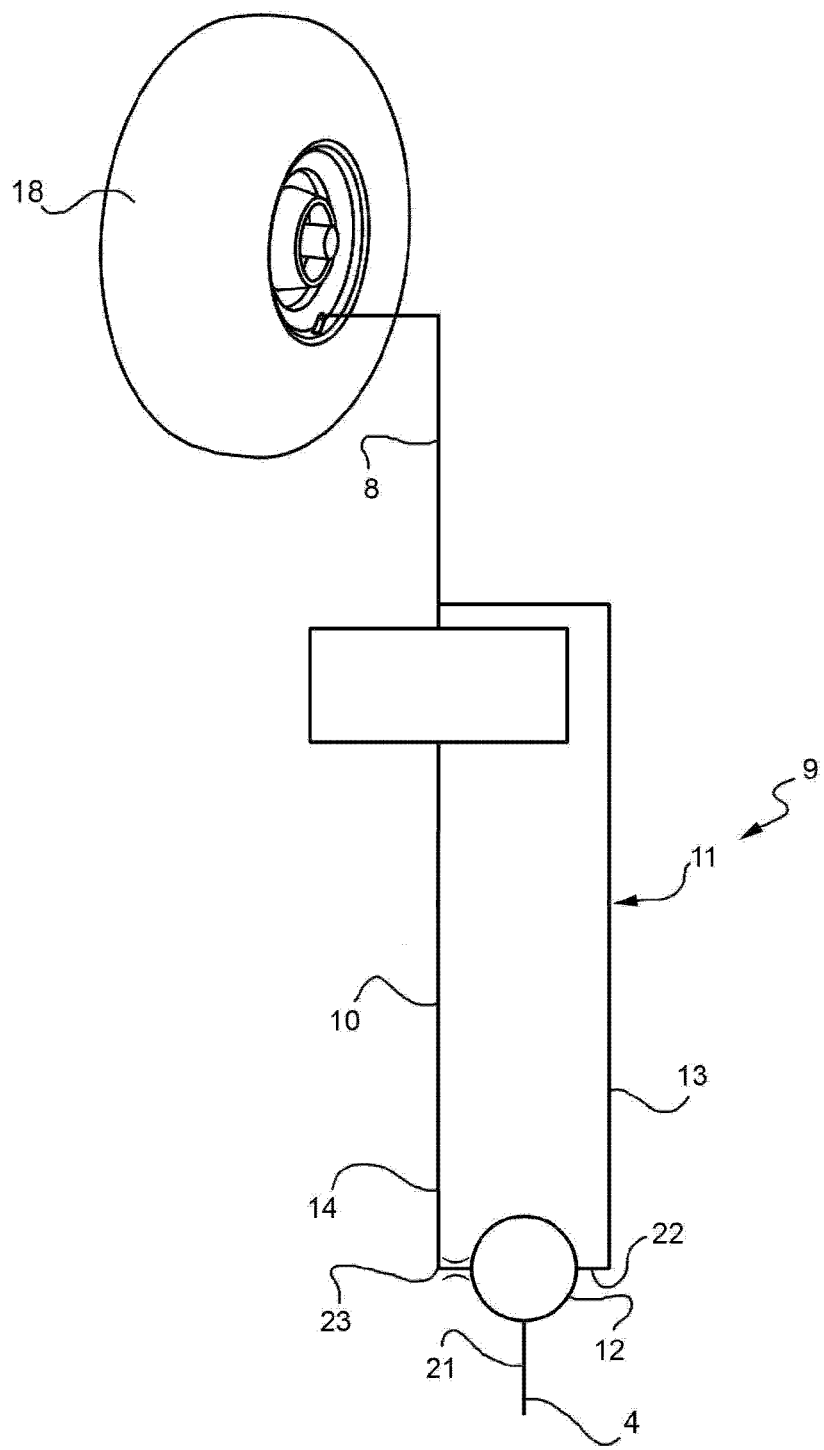
FIG. 2 shows a diagram of a fluid circuit of the kit according to the present invention.

FIG. 2 shows a diagram of a fluidic circuit 9 housed at least partly inside casing 2.

Fluidic circuit 9 comprises inlet 4; and a repair branch 10 and inflation branch 11 selectable by a one-inlet, two-outlet selector valve 12 user-switchable manually by knob 7.

Inflation branch 11 comprises a conduit 13 connecting inlet 4 directly to a tyre 18.

Repair branch 10 comprises a conduit 14 connected to canister 3 and parallel to conduit 13 with respect to selector valve 12.

Figure 3:
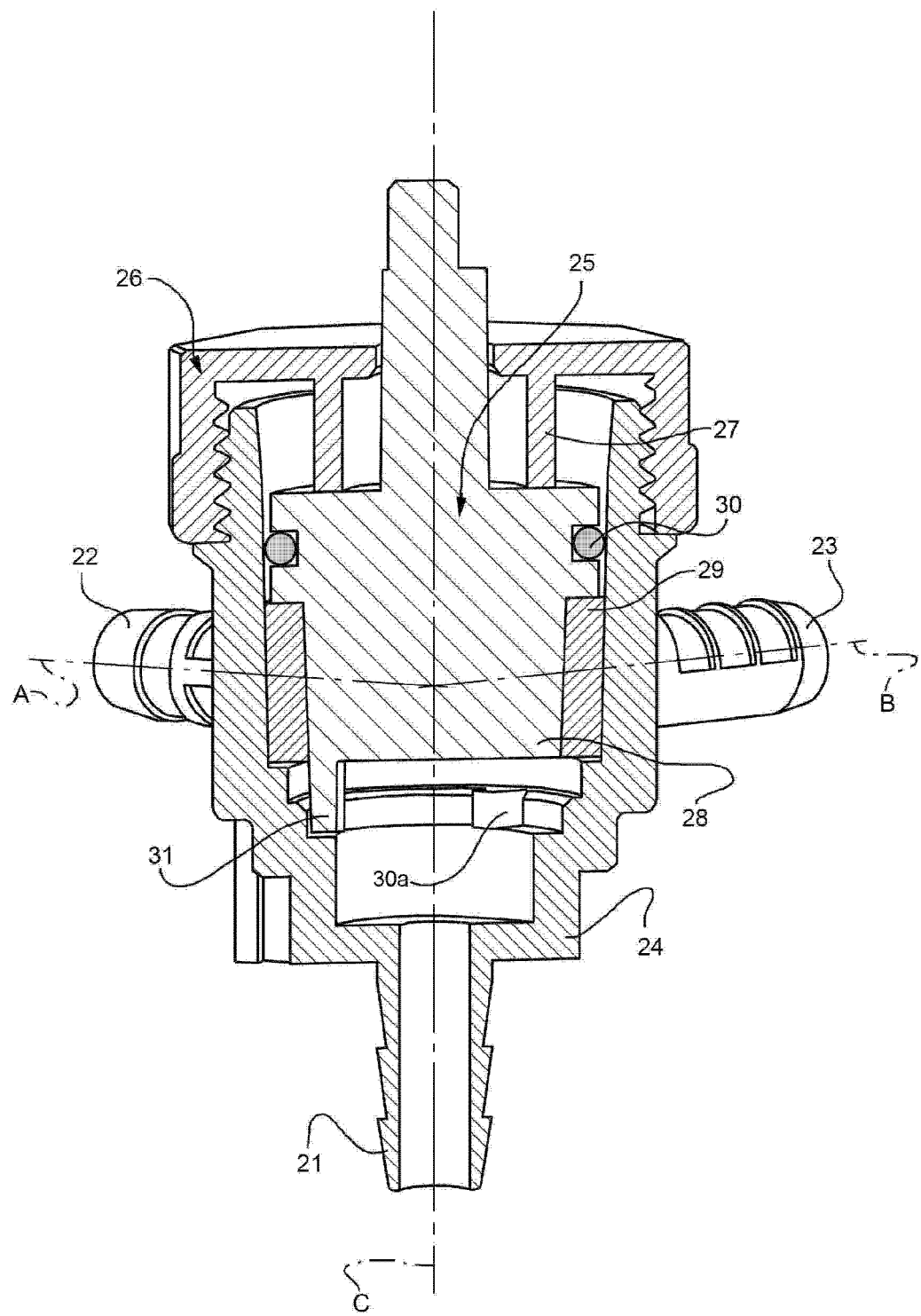
FIG. 3 shows a longitudinal section of a component part of the FIG. 1 kit.

As shown in FIG. 3, selector valve 12 defines an inlet 21; a first outlet 22 having an axis A; and a second outlet 23 having an axis B. Outlet 22 is connected to conduit 13 to inflate tyre 18, and outlet 23 is connected to canister 3 by conduit 14.

More specifically, selector valve 12 comprises a hollow body 24 defining inlet 21 and outlets 22, 23; a rotary shutter 25 inside hollow body 24; and a cap 26 closing rotary shutter 25 inside hollow body 24. In the embodiment shown, inlet 21 comes out inside hollow body 24, on the opposite side of rotary shutter 25 to cap 26; and outlets 22, 23 face rotary shutter 25 so that the compressed airflow is diverted to generate a force, on rotary shutter 25, having a component parallel to the axis of rotation C of shutter 25.

This force loads a thrust bearing 27, preferably a friction bearing, defined by and, for example, in one piece with cap 26.

More specifically, rotary shutter 25 comprises a main body 28 connected to knob 7; an insert 29 fixed with respect to main body 28 and contacting hollow body 24 to define a first sliding seal; and a second sliding seal 30 in series with the first sliding seal towards cap 26.

Insert 29 is made of elastically deformable polymer material that contacts hollow body 24 over an area varying in size in a direction parallel to axis A.

The second sliding seal is preferably an O-ring fitted between main body 28 and hollow body 24, between outlets 22, 23 and cap 26.

Main body 28 and hollow body 24 define two stops 30a (only one shown) which cooperate with a projection 31 to define the maximum relative angular position.

Figure 4:
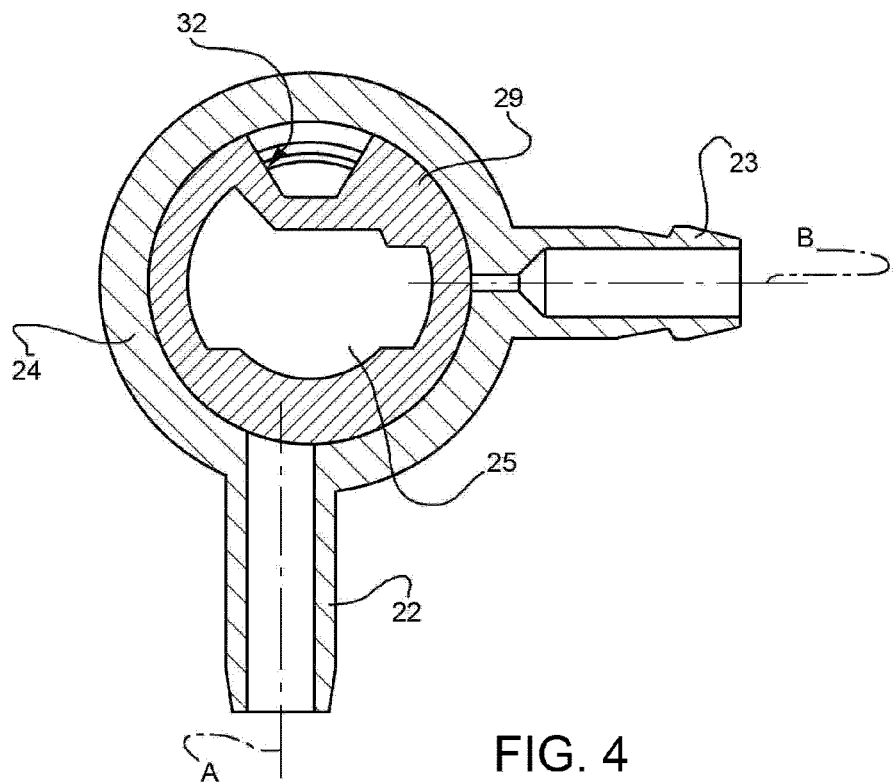
FIGS. 4 and 5 show sections in the planes through axes A and B in FIG. 3, in different operating positions.
Figure 5:
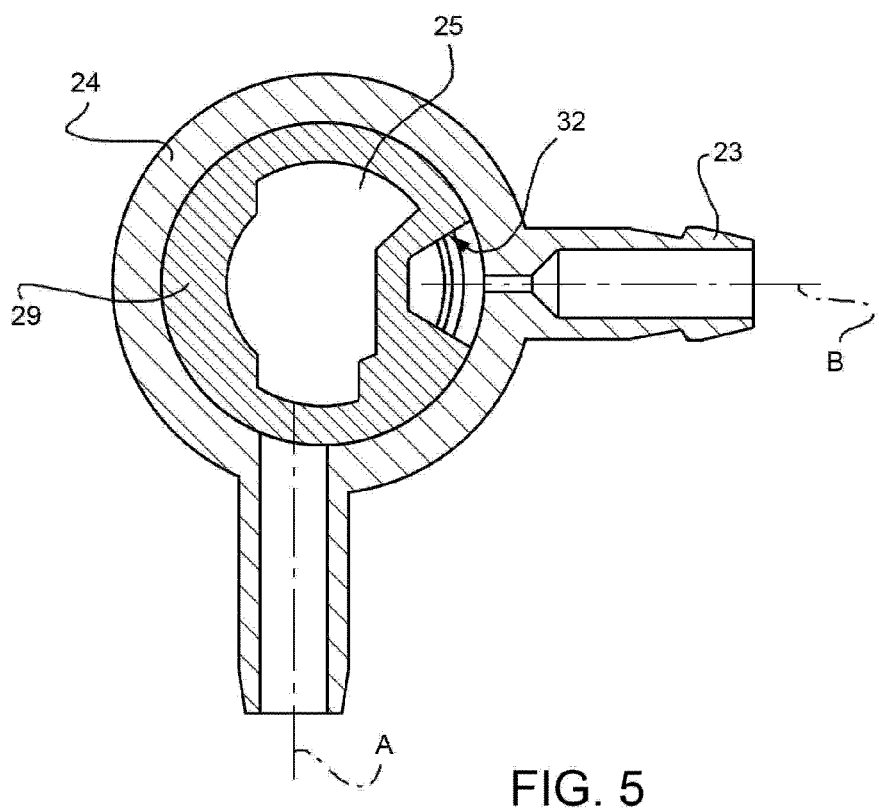

FIGS. 4 and 5 show details of rotary shutter 25, which defines a cavity 32 for fluidically connecting inlet 21 to outlet 22 or outlet 23. Axially, insert 29 defines a continuous fluid seal between cavity 32 and second sliding seal 30, regardless of the angular position of rotary shutter 25.

Circumferentially, the size of cavity 32 and the angular distance between outlets 22 and 23 are such that inlet 21 is connected to one of outlets 22, 23, while compressed airflow to the other is cut off by insert 29.

Outlets 22 and 23 have different flow resistances, so that outlet 23 reduces the pressure from inlet 4 to a greater extent than outlet 22.

Outlet 22 preferably has a larger flow section than outlet 23.

Kit 1 operates as follows.

When the kit is stowed on the vehicle, selector valve 12 is set to a safety setting closing both outlets 22, 23, so the kit can be connected to a heavy-duty vehicle compressed-air circuit, with no risk of accidental compressed airflow along conduit 13 or 14.

To repair tyre 18, hose 8 is connected to the tyre, and selector valve 12 switched to open outlet 23 and close outlet 22.

Pressure is reduced by outlet 23 to supply compressed air at the right sealing fluid injection pressure and prevent premature coagulation of the sealing fluid. Pressure is preferably reduced to 6 bars or less, and more preferably to less than 4 bars.

Outlet 23 preferably emits an acoustic signal, e.g. generated by compressed airflow, when the compressed-air pressure and/or flow rate exceed a given threshold.

Once the sealing fluid is injected, selector valve 12 is switched to open outlet 22 and close outlet 23. Compressed air flows at a higher pressure along conduit 13 than conduit 14, to inflate tyre 18 faster.

The kit according to the present invention has the following advantages.

The flow resistance of outlet 23 ensures the best pressure into the sealing fluid canister.

The flow resistance is built into outlet 23 of selector valve 12 to reduce the number of kit component parts for assembly.

The first and second sliding seals 29, 30 are arranged in series to better prevent leakage towards cap 26.

The acoustic signal indicates correct operation of the kit.

Clearly, changes may be made to kit 1 as described and illustrated herein without, however, departing from the scope of the accompanying Claims.

In particular, canister 3 may be either fixed or detachable from casing 2.

Conduit 13 may be connected to hose 8 downstream from canister 3, as shown in FIG. 2, or may comprise an inflation hose separate from hose 8 and connectable directly to tyre 18.

Outlet 23 defines an acoustic indicator which may even be digital and/or powered by an energy source other than pressurized fluid, and which may be provided on any inflatable article repair and inflation kit comprising a canister of sealing fluid; an inlet connectable to a pressure source and connected to the canister; a selector valve interposed fluidically between the inlet and the canister; and a conduit connected to the selector valve, in parallel with the canister.

What is claimed is:

1. An inflatable article repair and inflation kit comprising a canister of sealing fluid; an inlet connectable to a pressure source and connected to said canister; a selector valve interposed fluidically between said inlet and said canister; a conduit connected to said selector valve, in parallel with said canister; and a flow resistance located between a movable shutter of said selector valve and said canister to reduce the pressure in said canister with respect to the pressure in said conduit wherein said flow resistance is fitted to a hollow body housing said movable shutter.

2. A kit as claimed in claim 1, wherein said flow resistance forms one piece with said hollow body.

3. An inflatable article repair and inflation kit comprising a canister of sealing fluid; an inlet connectable to a pressure source and connected to said canister; a selector valve interposed fluidically between said inlet and said canister; a conduit connected to said selector valve, in parallel with said canister; and a flow resistance located between a movable shutter of said selector valve and said canister to reduce the pressure in said canister with respect to the pressure in said conduit comprising an acoustic indicator which emits an acoustic signal when the compressed airflow pressure and/or flow rate exceed a given threshold.

4. A kit as claimed in claim 3, characterized in that said acoustic indicator is powered by compressed airflow generated by said pressure source.

5. A kit as claimed in claim 4, characterized in that said acoustic indicator is defined by said flow resistance (23).

6. A kit as claimed in claim 1, wherein said selector valve comprises a first and second fluid seal arranged in series with respect to a further inlet defined by said selector valve.

7. A kit as claimed in claim 6, wherein said selector valve comprises a cap for closing said movable shutter inside said hollow body; and in that said first and second fluid seal are interposed between said further inlet and said cap.

8. A kit as claimed in claim 1, comprising a casing housing at least said selector valve; and in that said canister is connected, and fixed with respect, to said casing.

9. A kit as claimed in claim 3, wherein said selector valve comprises a first and second fluid seal arranged in series with respect to a further inlet defined by said selector valve.

10. A kit as claimed in claim 9, wherein said selector valve comprises a cap for closing said movable shutter inside said hollow body; and in that said first and second fluid seal are interposed between said further inlet and said cap.

11. A kit as claimed in claim 3, comprising a casing housing at least said selector valve; and in that said canister is connected, and fixed with respect, to said casing.

* * * * *